(12) United States Patent
Maruyama et al.

(10) Patent No.: US 6,393,563 B1
(45) Date of Patent: May 21, 2002

(54) TEMPORARY DIGITAL SIGNATURE METHOD AND SYSTEM

(75) Inventors: Hiroshi Maruyama, Tokyo-to; Naohiko Uramoto, Yokohama, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/189,203

(22) Filed: Nov. 10, 1998

(30) Foreign Application Priority Data

Nov. 11, 1997 (JP) ............................................. 9-308262

(51) Int. Cl.[7] ................................................ G06F 9/00
(52) U.S. Cl. ........................ 713/155; 713/156; 713/168; 713/169; 380/255
(58) Field of Search ........................ 380/255; 713/155, 713/156, 158, 168, 169, 171, 175, 176

(56) References Cited

U.S. PATENT DOCUMENTS 6,088,451 A * 7/2000 He et al. ...................... 380/25
6,122,625 A * 9/2000 Rosen .......................... 705/65
6,141,750 A * 10/2000 Micali ......................... 713/168

* cited by examiner

*Primary Examiner*—Thomas R. Peeso
(74) *Attorney, Agent, or Firm*—William A. Kinnaman

(57) ABSTRACT

A digital signature system that employs a temporary digital ID signed by using a private key, so that the digital ID can be used as a proxy for a specific period of time and for a specific purpose. When a signature is requested by a server application, a user does not use his or her private key, but employs a temporary key generated using the private key. A temporary certificate for the temporary key is signed using the user's private key. The temporary certificate includes information concerning the period of time during which the temporary certificate is valid and information concerning the purpose for which used. Upon receipt of a request from an application that a document be signed, a client transmits to the server a document signed using the temporary key, the temporary certificate and a user's certificate. First, the server examines the signature; second, it determines whether the temporary certificate is still effective, i.e., whether the period of time during which valid has expired and whether the certificate is for another application; and third, confirms that the temporary certificate has been signed by an authenticated user. Finally, the server validates of the user's certificate.

30 Claims, 5 Drawing Sheets

TEMPORARY DIGITAL SIGNATURE METHOD AND SYSTEM

BACKGROUND OF THE INVENTION

1. Field of the Invention

The present invention relates to a method and a system for authenticating a user by using digital certificates for public key cryptography, and in particular to a method and a system for employing as a proxy a temporary digital ID signed by using a personal key.

2. Description of the Related Art

In the process of the development of public key cryptography, personal authentication has come to be performed by using digital certificates. For authentication using digital certificates, in order to prevent copying of a user's private key, a smart card has been developed in which the private key is stored and from which external reading of the private key is inhibited.

A smart card is an intelligent device having an internal memory. Information stored inside the smart card is protected by using a password, and the reading or rewriting of the data using an illegal method is inhibited (tamperproof). Therefore, a user can safely store private data. Since an authentication process (specifically, the signing of a document using a private key) using a smart card can not be performed unless the user physically owns the card, the smart card is considered to be safer than a hard disk or a floppy disk for the storage of a private key. However, for an application that requires the continuous employment of a key, to use a smart card, the card must be inserted into a computer terminal, and when the smart card holder leaves his or her desk for a while, he or she must remove the card and interrupt the execution of the application.

A process that employs a Secure Socket Layer (SSL) is well known as a safe encrypted communication method that is employed for both public key cryptography and private key cryptography. For the SSL process an encryption key is changed each session. In short, communication is performed by providing a different key for each page. While no detailed explanation is given for the applicable protocol, an outline of the interactive authentication protocol, such as is used for the SSL3 process, is as follows.

First, when a user is requested by a server-side application to sign a document, the user employs his or her private key to transmit to the server a signed document and a user's certificate. The server examines the signature on the document, confirms that the signature was applied by an authenticated user, and validates the user's certificate. Although with the SSL process a single session seldom lasts several months, a Web site that employs an SSL must use a private key of a server each time it receives an SSL connection request. If the private key is stored in a smart card, the card must be inserted into the server frequently, or it must be retained at the server constantly.

If a personal key is also stored in the smart card, it is also very inconvenient when at midnight a site that requires client authentication by the SSL3 process is automatically updated by using cyclic software.

SUMMARY OF THE INVENTION

It is, therefore, one object of the present invention to provide a system that employs a temporary digital ID (identifier) signed by using a private key, so that the digital ID can be used as a proxy for a specific period of time and for a specific purpose.

It is another object of the present invention to provide a method and a system that enables a user to perform a signature authentication process even if he or she does not physically possess a card.

It is an additional object of the present invention to provide a signature authentication method and system for which a private key is not required each time a private key is requested by an application that is running continuously.

It is a further object of the present invention to provide a method and system comprising a chain of signature authentication processing steps.

To achieve the above objects, when a signature is requested by a server application, a user does not use his or her private key, but employs a temporary key generated using the private key. A temporary certificate for the temporary key is signed using the user's private key.

The temporary certificate includes information concerning the period of time during which the temporary certificate is valid and information concerning the purpose for which used. Upon receipt of a request from an application that a document be signed, a client transmits to the server a document signed using the temporary key, the temporary certificate and a user's certificate. First, the server examines the signature; second, it determines whether the temporary certificate is still effective, i.e., whether the period of time during which it is valid has expired and whether the certificate is for another application; third, it confirms that the temporary certificate has been signed by an authenticated user. Finally, the server validates the user's certificate.

DESCRIPTION OF THE PREFERRED EMBODIMENT

Figure 1:
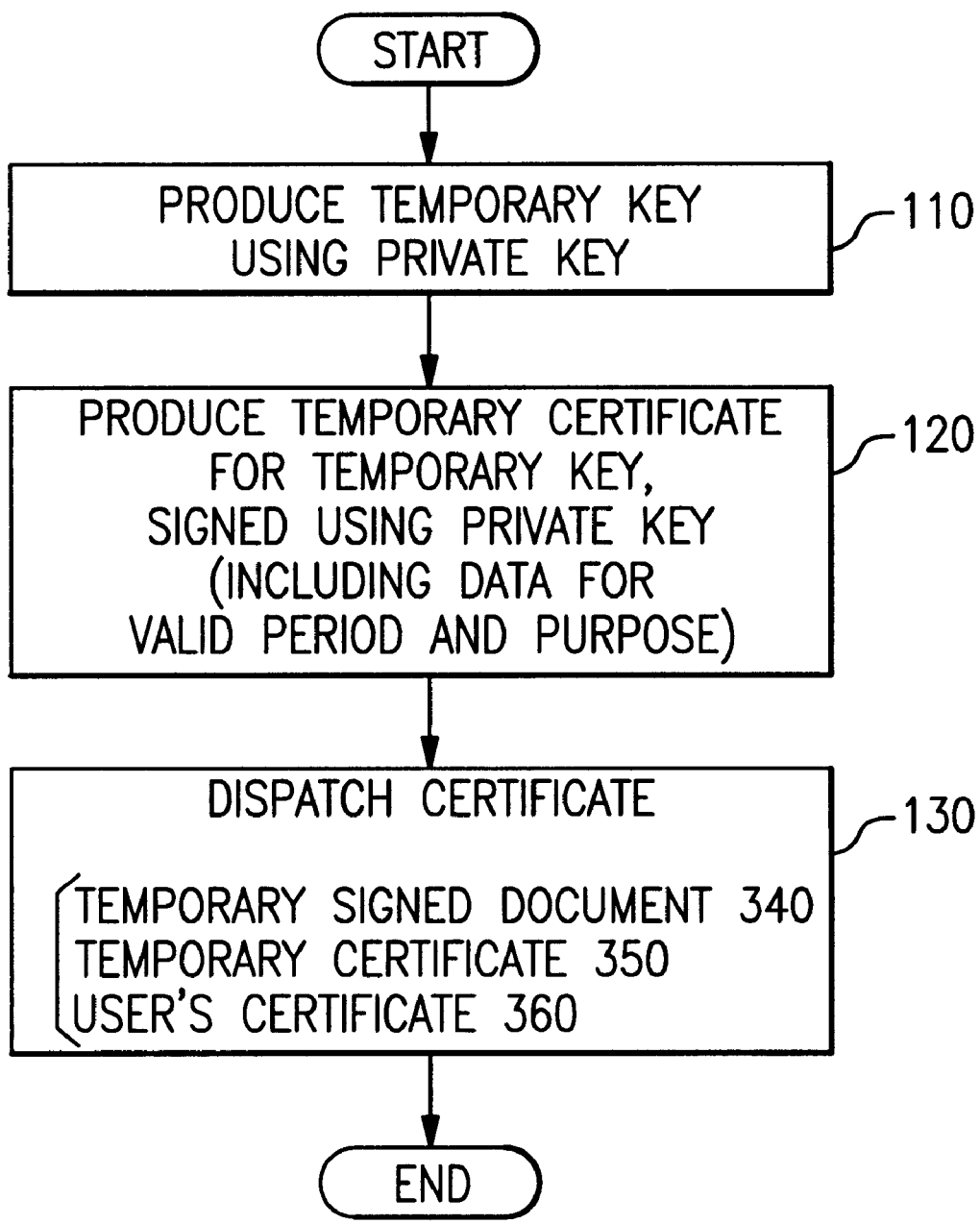
FIG. 1 is a flowchart showing the processing for a temporary signature system according to the present invention.

FIG. 1 is a flowchart showing the processing, using public key cryptography, performed by a temporary digital signature system that temporarily signs a document without using a user's private key. At block 110, a private key of a user is employed to produce a temporary key. At block 120, a temporary certificate is produced for the temporary key that is signed by the private key. Finally, at block 130, the temporary certificate, a document signed using the temporary key, and a certificate for the user are transmitted to a signature-requesting source. The temporary certificate includes information concerning the period of time the temporary certificate is valid and information concerning the purpose for which it may be used.

Figure 2:
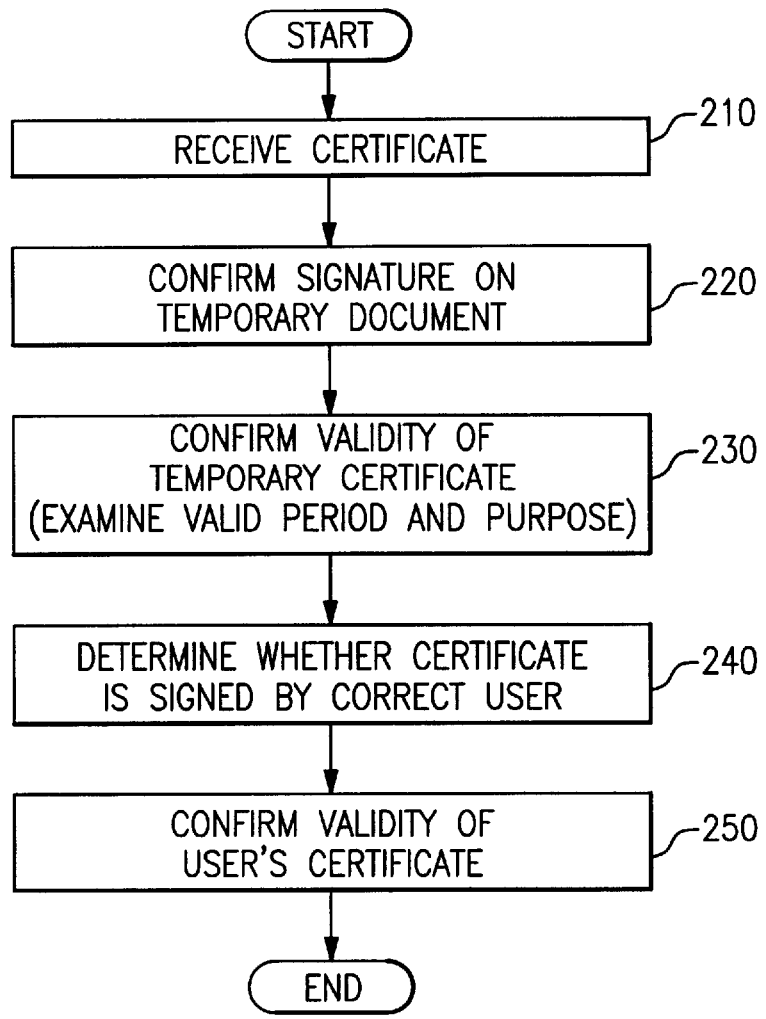
FIG. 2 is a flowchart showing the processing for a temporary authentication system according to the present invention.

FIG. 2 is a flowchart showing the processing, using public key cryptography, performed by a temporary digital authentication system that authenticates a temporary signed document transmitted by a user. At block 210, a temporary certificate, a document signed by using a temporary key, and a certificate for the user are received. At block 220, the signature on the temporary signed document is approved. At block 230, a check is performed to determine whether the temporary certificate is still effective (whether the period for the employment of the temporary certificate has not yet expired, or whether the certificate is employed in accordance with the purpose for which used). At block 240 a check is performed to determine whether the temporary certificate was signed by the authenticated user. Finally, at block 250 the user's certificate is validated. The valid period and the purpose are used to determine the validity of the temporary certificate, and are the data examples that will most probably be employed. The modification and addition of such data is possible without departing from the subject of the present invention; e.g., data concerning the name of a specific server, the name of an application, a specific device model, or an environment.

Figure 3:
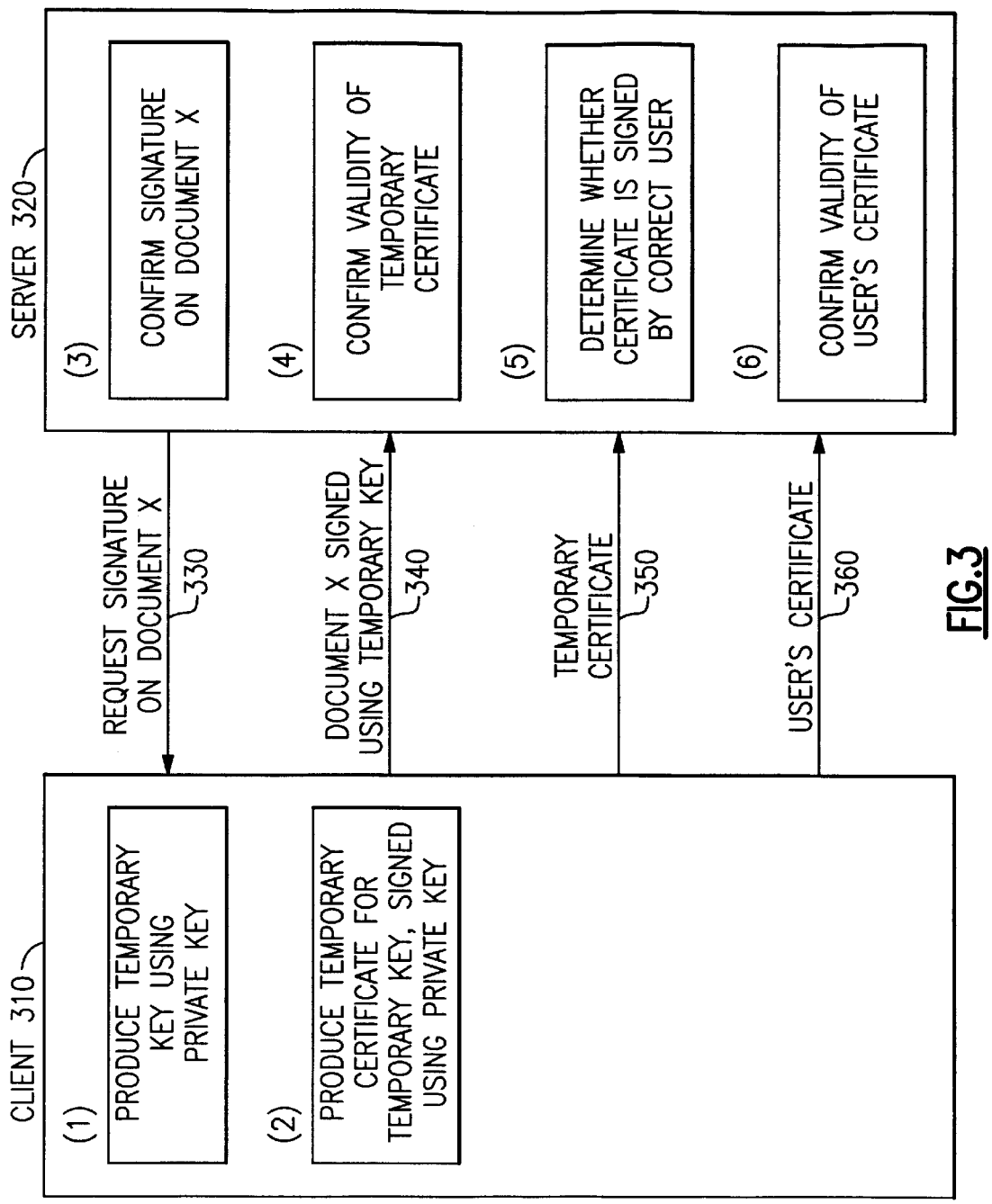
FIG. 3 is a diagram showing the protocol for a temporary signature authentication client/server system.

FIG. 3 is a diagram showing the protocol for a temporary digital signature authentication client/server system, employing public key cryptography, that temporarily signs and authenticates a document without using a user's private key. First, a client 310 produces a temporary key using a private key (1); then, the client 310 produces a temporary certificate for the temporary key signed using the private key (2). When a server 320 issues a signing request 330 to a document X, the client 310 transmits to the server 320 a document X 340 signed by using the temporary key, the temporary certificate 350, and a user's certificate 360. The server 320 receives the document 340 signed by using the temporary key, the temporary certificate 350, and the user's certificate 360, and verifies the signature on the document 340 (3); verifies the validity of the temporary certificate 350 (4); verifies that the temporary certificate 350 was signed by an authenticated user (5); and validates the user's certificate 360 (6). To validate the temporary certificate 350, a check is performed to determine whether or not the temporary certificate (5) is still valid, or whether it corresponds to the purpose for which used.

The process for producing the private key and the process for producing the temporary certificate may be repeated a plurality of times, so that the signing and the authentication processing can be performed as several distinct steps. The private key should be stored in a secured space, such as in a smart card.

Figure 4:
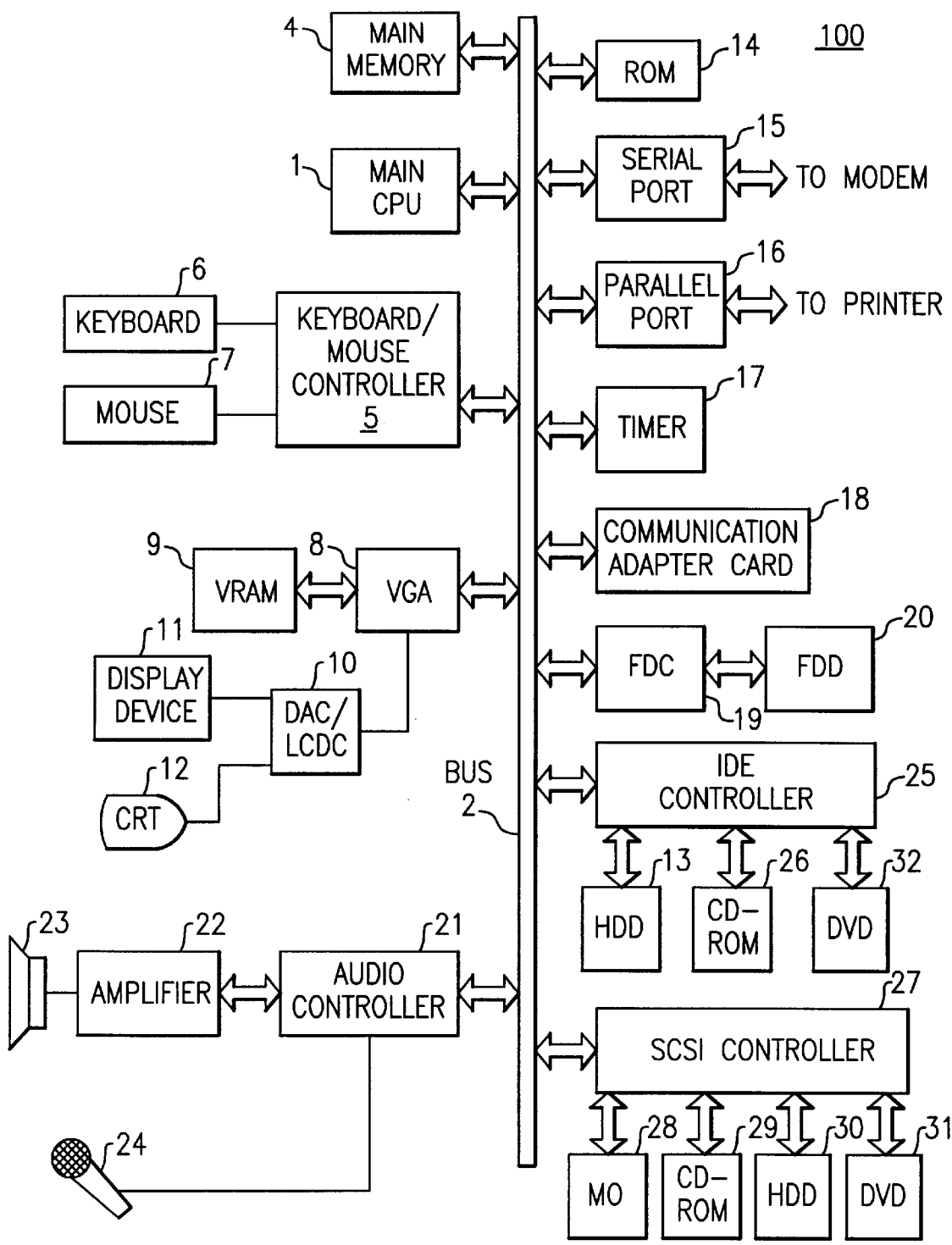
FIG. 4 is a diagram illustrating a hardware arrangement for a system according to the present invention.

The preferred embodiment of the present invention will now be explained while referring to the accompanying drawings. FIG. 4 is a diagram illustrating the hardware arrangement of a system according to one embodiment of the present invention. A system 100 includes a central processing unit (CPU) 1 and a memory 4. The CPU 1 and the memory 4 are connected via a bus 2 to an IDE controller 25 and to a hard disk drive 13 (or to a driver for another storage medium, such as an MO (not shown), a CD-ROM 26 or a DVD 32), which is an auxiliary device. Similarly, the CPU 1 and the memory 4 are connected via the bus 2 to a SCSI controller 27 and a hard disk drive 30 (or to a driver for another storage medium, such as an MO 28, a CD-ROM 29 or a DVD 31), which is an auxiliary device. A floppy disk drive 20 is connected via a floppy disk controller 19 to the bus 2.

A floppy disk (not shown) is inserted into the floppy disk drive 20. Computer program code, which interacts with an operating system and issues commands to the CPU 1, etc., to implement the present invention, is stored on the floppy disk or on a hard disk drive 13 (or on another storage medium, such as an MO, a CD-ROM or a DVD) and in a ROM 14, and is loaded into the memory 4 for execution. The computer program code may be compressed, or may be divided into a plurality of segments and stored on a plurality of media.

The system 100 further includes user interface hardware components, such as a pointing device 7 (a mouse or a joystick) or a keyboard 6 for data entry, or a display 12 for providing visually data for a user. A printer (not shown) and a modem (not shown) can be connected to the system 100 via a parallel port 16 and a serial port 15, respectively. The system 100 can also be connected to a network via the serial port 15 or the modem, or a communication adaptor 18 (an ethernet or a token ring card) for communication with another computer. A remote-controlled transceiver (not shown) may be connected to the serial port 15 or to the parallel port 16 to exchange data using infrared rays or electric waves.

A loudspeaker 23 receives an analog audio signal, which is obtained by a D/A (digital/analog) conversion performed by an audio controller 21, via an amplifier 22, and outputs it as sound. The audio controller 21 receives audio data from a microphone 24 and performs an A/D (analog/digital) conversion of it, and fetches external audio data.

It can be easily understood that the system 100 of the present invention may be provided as an ordinary personal computer (PC), a workstation, a notebook PC, a palmtop PC, a network computer, a home electric appliance, such as a television incorporating a computer, a game machine having a communication function, a telephone, a facsimile machine, a portable telephone, a PHS, a communication terminal having a communication function, including a personal digital assistant, or a combination of them. Please note, that the previously described components are merely examples, and that not all the components are required for the present invention. The system 100 can be applied by either a server system or a client system of the present invention.

Figure 5:
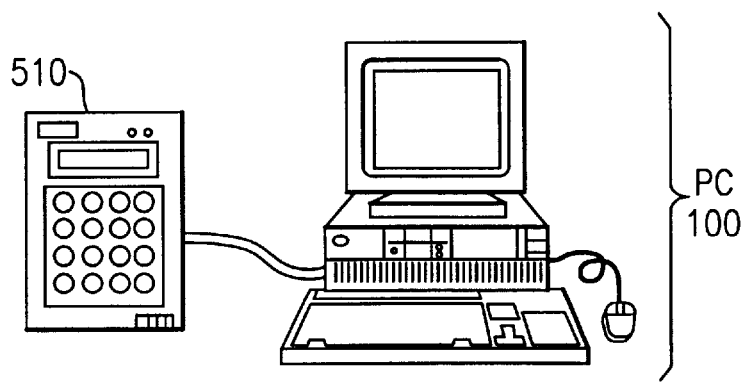
FIG. 5 is an external diagram showing a system that is connected to a smart card input/output (I/O) device.

FIG. 5 is an external diagram showing a system 100 that is connected to a smart card input/output (I/O) device 510. When the private key is stored in the smart card, a smart card I/O device 510 is connected to the serial port 15 of the system 100. To provide an interface between the smart card I/O device 510 and the system 100, many methods can be used, such as a connection to a keyboard controller 5, or a connection to an infrared communication port, the parallel port 16 or the communication adaptor card 18. The main processing performed by the system 100 will now be described.

An outline of the processing will now be described. For a signature requested by a server application, instead of a private key (MYkey), a user employs a temporary key (TEMPkey) temporarily generated using the private key. A temporary certificate (TEMPcert) for the temporary key (TEMPkey) is signed using the user's private key (MYkey).

The temporary certificate (TEMPcert) includes information concerning a period of time for which the temporary certificate is valid and information concerning the purpose for which used. Upon receipt of a request from an application that a document X is signed, a client transmits to the server a document ($SIGN_{TEMPkey}(X)$) signed by the temporary key, the temporary certificate (TEMPcert) and a user's certificate (MYcert). First, the server examines the signature; second, it determines whether the temporary certificate (TEMPcert) is still effective, i.e., whether the period of time it is valid has expired and whether it is certificate for another application; and third, it confirms that the temporary certificate (TEMPcert) was signed by the authenticated user. Finally, the server validates the user's certificate (MYcert).

The processing will now be described in detail. The user's private key is called MYkey, and the user's certificate is called MYcert. The MYcert is signed by a certificate authority (CA). The certificate of the CA is called CAcert.

Assume that a server application (APP) continuously requests a signature using MYkey (for example, when a Web site requesting that personal authentication is obtained using the SSL3 is periodically and automatically accessed). This application APP includes a private key APPkey and a certificate APPcert (in many cases it is the Web server's certificate).

With the conventional method, a document X from the client is transmitted and the signing of the document X using the private key (MYkey) is requested. This signed document is described as $SIGN_{MYkey}(X)$. The client transmits this signature and the certificate (MYcert) to the server. The application employs the public key included in the certificate (MYcert) to confirm that the received signed document $SIGN_{MYkey}(X)$ has been signed by the correct user, and also examines the certificate (CAcert) of the certificate authority (CA) and its valid period to determine whether the certificate (MYcert) is a currently effective digital certificate.

In the present invention, for a signature requested by the server application, a temporary key (TEMPkey) is employed instead of the private key (MYkey). Generally, the RSA public key encryption method is employed to produce the temporary key. In this case, according to the RSA method, a public key and a private key are produced from primary numbers generated at random. The key production may be performed by software either in the system 100, or in the smart card. Another public key encryption method may also be employed. The temporary certificate (TEMPcert) for the temporary key (TEMPkey) is signed using the user's private key (MYkey). The temporary certificate (TEMPcert) includes the following information:

DN=[user-dn]+"'s temporary certificate for"+[APP name]
Valid-thru=[current-date/time+1 day]
Only-for=[APPcert's DN]
Signed-by=[user-dn]
Signature=[signature by MYkey]

Figure 6:
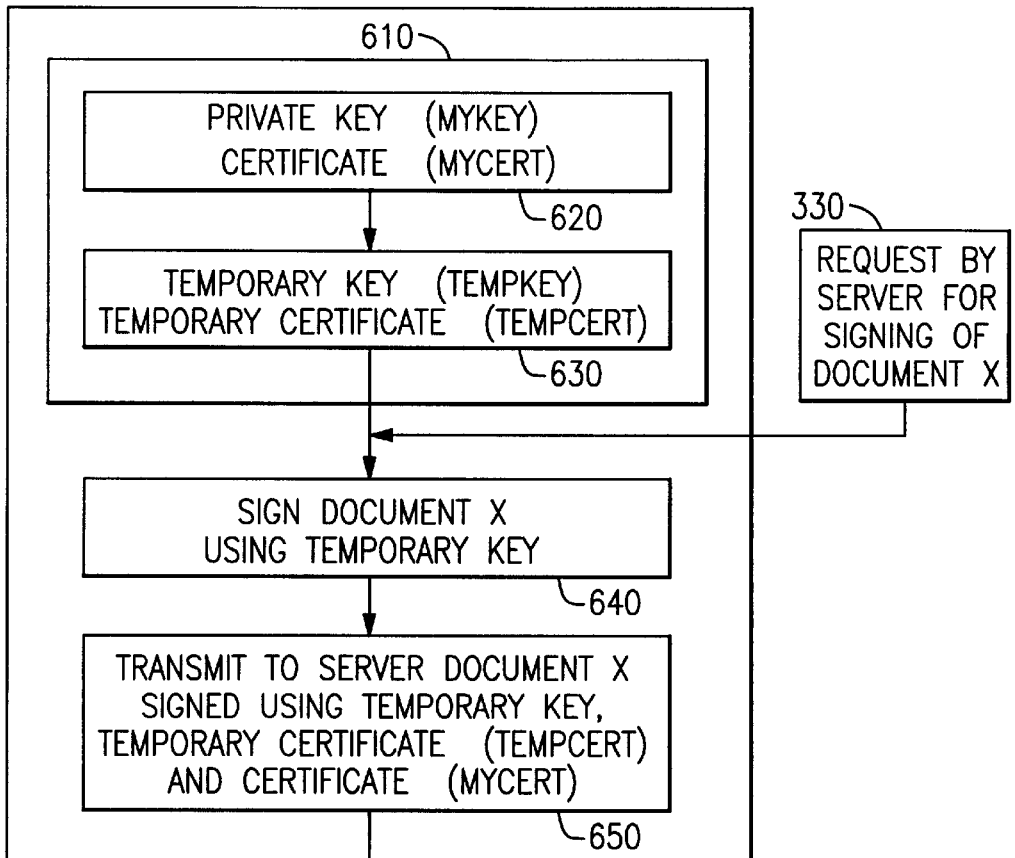
FIG. 6 is a flowchart showing the method according to the present invention.

FIG. 6 is a flowchart for the method of the present invention. First, as preparation, the client 310 uses his or her private key (MYkey) to produce a temporary key (TEMPkey) and a temporary certificate (TEMPcert) 630. The especially important information is that concerning a valid period (Valid-thru) and the purpose for use (Only-for), which are included in the temporary certificate (TEMPcert). In the above example, the valid period is designated as the current time+one day. Using the above data, a certificate is produced that can be used only for a specific period and for a specific purpose, and it should not be used for any other purpose.

When the private key is stored in the smart key, once the temporary key (TEMPkey) and the temporary certificate (TEMPcert) are generated, a user may remove the smart card from a reader. When a signing request 330 to a document X is issued by the application, at step S640 the client signs the document X using the temporary key (TEMPkey), and at step S650, the client transmits to the server 320 the signed document $SIGN_{TEMPkey}(X)$, the temporary certificate (TEMPcert) and the user's certificate (MYcert).

At step S660 the server 320 confirms the signature on the document X. At step S670, a check is performed to determine whether or not the temporary certificate (TEMPcert) is valid (whether the valid period has expired or whether it is for another application). At step S680, a check is performed to determine whether the temporary certificate (TEMPcert) has been signed by the correct user. Specifically, for signing the temporary certificate (TEMPcert), a hash value of the temporary certificate (TEMPcert) is acquired and is signed using the private key. To approve this signature, the hash value of the temporary certificate (TEMPcert) is calculated, and the result is compared with the signature decoded by the user's public key. If they match, the signature is approved. Finally, at step S690, the validity of the user's certificate (MYcert) is confirmed. To do this, since the signature of the certificate authority (CA) is included in the user's certificate (MYcert), first, the valid period is examined to determine whether the certificate is invalid. Then, a check is performed to determine whether the certificate authority is a reliable authentication organization, and a check is performed to determine whether the signature is provided by the authentication organization (processing concerning the hash value, previously described). This is the same as the general method used for validating a certificate. According to this system, the pair of the temporary key and the certificate, which is effective only for a specific period and for a specific purpose, can be used as a proxy.

A plurality of steps may be provided for the temporary key production process and the certificate production process. At the temporary key production process, a tentative, temporary key is produced from a temporary key, and this procedure is repeated an arbitrary number of times. Similarly, a certificate is produced in accordance with each temporary key. As is described above, when a plurality of signing steps are prepared, and accordingly, the authentication process is separated into many steps, a signature authentication system can be provided that performs an arbitrary number of steps for authentication processing. This system can be employed for certificate validation/invalidation at a specific process step and the following steps.

As another example, when a site that requires client authentication is automatically updated at midnight by using cyclic software, the present invention can be employed for an unmanned cyclic system that with the server performs an automatic authentication.

According to the present invention, a temporary signature authentication system that does not always require a smart card, or an unmanned signature authentication system, can be provided. In addition, when an arbitrary number of steps are employed for signature authentication, a flexible authentication and invalidation process for a certificate can be provided.

What is claimed is:

1. A digital signature system, employing public key cryptography, that provides a temporary signature without requiring the use of a private key for a user, comprising:

(a) a temporary signature key producer for producing a temporary signature key by using a private key;

(b) a temporary certificate producer for producing a temporary certificate for said temporary signature key signed by using said private key; and (c) means for, when a signature for a document is requested, transmitting to a signature requester said temporary certificate, a document signed using said temporary signature key, and a user's certificate.

2. The digital signature system according to claim 1, wherein said temporary certificate includes information concerning a valid period for said temporary certificate.

3. The digital signature system according to claim 1, wherein said temporary certificate includes information concerning the purpose for which used.

4. The digital signature system according to claim 1, wherein said temporary signature key producer (a) further includes (a1) means for producing a tentative temporary key using said temporary signature key; wherein said temporary certificate producer (b) includes (b1) means for producing a temporary certificate for said tentative temporary key signed by using said private key; wherein processing by said means (a1) and (b1) is repeated more than once, so that temporary signature key and temporary certificate production processing is performed as a plurality of separate stages.

5. The digital signature system according to claim 1, wherein said private key is stored in a smart card.

6. A digital authentication system, employing public key-cryptography, that authenticates a temporary signed document dispatched by a user, comprising:
  (a) means for receiving a temporary certificate, a document signed by using a temporary signature key, and a user's certificate;
  (b) means for validating a signature on said document;
  (c) means for validating said temporary certificate;
  (d) means for confirming that said temporary certificate has been signed by an authenticated user; and
  (e) means for validating said user's certificate.

7. The digital authentication system according to claim 6, wherein said means (c) includes means for determining whether a time period during which said temporary certificate is valid had not yet expired.

8. The digital authentication system according to claim 6, wherein said means (c) includes means for determining whether said temporary certificate corresponds to the purpose for which used.

9. A digital signature authentication client/server system, employing public key cryptography, that performs a temporary document signing without directly using a private key, and for authenticating a signature, said system comprising:
  (a) a temporary signature key producer at a client for producing a temporary signature key by using a private key;
  (b) a temporary certificate producer for producing a temporary certificate, for said temporary signature key, signed using said private key;
  (c) means for, when signing of a document is requested by a server, transmitting from said client to said server said temporary certificate, a document signed using said temporary signature key, and a user's certificate;
  (d) means at said server for receiving said temporary certificate, said document signed using said temporary signature key, and said user's certificate;
  (e) means at said server for validating said signature on said document;
  (f) means at said server for validating said temporary certificate;
  (g) means at said server for confirming that said temporary certificate has been signed by an authenticated user; and
  (h) means at said server for validating said user's certificate.

10. The digital signature authentication client/server system according to claim 9, wherein said temporary certificate includes information concerning a time period during which said temporary certificate is valid, and wherein said means (f) includes means for determining whether a time period during which said temporary certificate is invalid has not yet expired.

11. The digital signature authentication client/server system according to claim 9, wherein said temporary certificate includes information concerning the purpose for which used, and wherein said means (f) includes means for determining whether said temporary certificate corresponds to the purpose for which used.

12. The digital signature authentication client/server system according to claim 9, wherein said temporary signature key producer (a) further includes (a1) means for producing a tentative temporary key using said temporary signature key; wherein said temporary certificate producer (b) includes (b1) means for producing a temporary certificate for said tentative temporary key signed by using said private key; wherein processing by said means (a1) and (b1) is repeated more than once, so that temporary signature key and temporary certificate production processing is performed as a plurality of separate stages.

13. The digital signature authentication client/server system according to claim 9, wherein said private key is stored in a smart card.

14. A digital signature method, employing public key cryptography, whereby a temporary signature is provided without requiring the use of a private key for a user, comprising:
  (a) a temporary signature key production step of producing a temporary signature key by using a private key;
  (b) a temporary certificate production step of producing a temporary certificate for said temporary signature key signed by using said private key; and
  (c) a step of, when a signature for a document is requested, transmitting to a signature requester said temporary certificate, a document signed using said temporary signature key, and a user's certificate.

15. The digital signature method according to claim 14, wherein said temporary certificate includes information concerning a valid period for said temporary certificate.

16. The digital signature method according to claim 14, wherein said temporary certificate includes information concerning the purpose for which used.

17. The digital signature method according to claim 14, wherein said temporary signature key production step (a) further includes (a1) a step of producing a tentative temporary key using said temporary signature key; wherein said temporary certificate production step (b) includes (b1) a step of producing a temporary certificate for said tentative temporary key signed by using said private key; wherein processing at said steps (a1) and (b1) is repeated more than once, so that temporary signature key and temporary certificate production processing is performed as a plurality of separate stages.

18. The digital signature method according to claim 14, wherein said private key is stored in a smart card.

19. A digital authentication method, employing public key cryptography, whereby a temporary signed document dispatched by a user is authenticated, comprising the steps of:
  (a) receiving a temporary certificate, a document signed by using a temporary signature key, and a user's certificate;
  (b) validating a signature on said document;
  (c) validating said temporary certificate;
  (d) confirming that said temporary certificate has been signed by an authenticated user; and
  (e) validating said user's certificate.

20. The digital authentication method according to claim 19, wherein said step (c) includes a step of determining whether a time period during which said temporary certificate is valid had not yet expired.

21. The digital authentication method according to claim 19, wherein said step (c) includes a step of determining whether said temporary certificate corresponds to the purpose for which used.

22. A digital signature authentication method, employing public key cryptography, whereby a temporary document signing is performed without directly using a private key for a user, and whereby a signature is authenticated, said method comprising:
   (a) a temporary signature key production step by a client for producing a temporary signature key by using a private key;
   (b) a temporary certificate production step of producing a temporary certificate, for said temporary signature key, signed using said private key;
   (c) a step of, when signing of a document is requested by a server, transmitting from said client to said server said temporary certificate, a document signed using said temporary signature key, and a user's certificate;
   (d) a step by said server of receiving said temporary certificate, said document signed using said temporary signature key, and said user's certificate;
   (e) a step by said server of validating said signature on said document;
   (f) a step by said server of validating said temporary certificate;
   (g) a step by said server of confirming that said temporary certificate has been signed by an authenticated user; and
   (h) a step by said server of validating said user's certificate.

23. The digital signature authentication method according to claim 22, wherein said temporary certificate includes information concerning a time period during which said temporary certificate is valid, and wherein said step (f) includes a step of determining whether a time period during which said temporary certificate is invalid has not yet expired.

24. The digital signature authentication method according to claim 22, wherein said temporary certificate includes information concerning the purpose for which used, and wherein said step (f) includes a step of determining whether said temporary certificate corresponds to the purpose for which used.

25. The digital signature authentication method according to claim 22, wherein said temporary signature key production step (a) further includes (a1) a step of producing a tentative temporary key using said temporary signature key; wherein said temporary certificate production step (b) includes (b1) a step of producing a temporary certificate for said tentative temporary key signed by using said private key; wherein processing at said steps (a1) and (b1) is repeated more than once, so that temporary signature key and temporary certificate production processing is performed as a plurality of separate stages.

26. The digital signature authentication method according to claim 22, wherein said private key is stored in a smart card.

27. A storage medium for storing a digital signature program, employing public key cryptography, that provides a temporary signature without requiring the use of a private key, said program comprising:
   (a) a temporary signature key production function for producing a temporary signature key by using a private key;
   (b) a temporary certificate production function for producing a temporary certificate for said temporary signature key signed by using said private key; and
   (c) a function for, when a signature for a document is requested, transmitting to a signature requester said temporary certificate, a document signed using said temporary signature key, and a user's certificate.

28. A storage medium for storing a digital authentication program, employing public key cryptography, that authenticates a temporary signed document dispatched by a user, said program comprising:
   (a) a function for receiving a temporary certificate, a document signed by using a temporary signature key, and a user's certificate;
   (b) a function for validating a signature on said document;
   (c) a function for validating said temporary certificate;
   (d) a function for confirming that said temporary certificate has been signed by an authenticated user; and
   (e) a function for validating said user's certificate.

29. The storage medium according to claim 28, wherein said function (c) includes a function for determining whether a time period during which said temporary certificate is valid had not yet expired, or whether said temporary certificate corresponds to the purpose for which used.

30. A storage medium for storing a digital signature authentication program, employing public key cryptography, that performs a temporary document signing without directly using a private key, and for authenticating a signature, said program comprising:
   (a) a temporary signature key production function at a client for producing a temporary signature key by using a private key;
   (b) a temporary certificate production function for producing a temporary certificate, for said temporary signature key, signed using said private key;
   (c) a function for, when signing of a document is requested by a server, transmitting from said client to said server said temporary certificate, a document signed using said temporary signature key, and a user's certificate;
   (d) a function at said server for receiving said temporary certificate, said document signed using said temporary signature key, and said user's certificate;
   (e) a function at said server for validating said signature on said document;
   (f) a function at said server for validating said temporary certificate;
   (g) a function at said server for confirming that said temporary certificate has been signed by an authenticated user; and
   (h) a function at said server for validating said user's certificate.

* * * * *